United States Patent [19]

Schilling

[11] Patent Number: 4,926,944
[45] Date of Patent: May 22, 1990

[54] LIGNIN-BASED CEMENT FLUID LOSS CONTROL ADDITIVE

[75] Inventor: Peter Schilling, Charleston, S.C.

[73] Assignee: Westvaco Corporation, New York, N.Y.

[21] Appl. No.: 297,653

[22] Filed: Jan. 17, 1989

[51] Int. Cl.⁵ .......................... C04B 7/02; E21B 33/14
[52] U.S. Cl. ........................................ 166/293; 106/90; 523/130
[58] Field of Search ................... 166/283, 293; 106/90, 106/92; 523/130–132; 524/650; 527/400

[56] References Cited

U.S. PATENT DOCUMENTS

| | | | |
|---|---|---|---|
| Re. 31,127 | 1/1983 | Childs et al. | 166/293 |
| Re. 31,190 | 3/1983 | Detroit et al. | 166/293 |
| 3,180,748 | 4/1965 | Holmgren et al. | 166/293 X |
| 3,375,873 | 4/1968 | Mitchell. | |
| 3,398,005 | 8/1968 | Felicetta et al. | 106/92 X |
| 3,662,830 | 5/1972 | Martin | 166/293 |
| 3,784,493 | 1/1974 | Giguere et al. | 527/400 |
| 3,804,058 | 4/1974 | Messenger | 166/293 X |
| 3,821,985 | 7/1974 | George | 166/293 |
| 3,984,363 | 10/1976 | D'Alelio | 527/400 X |
| 4,047,567 | 9/1977 | Childs et al. | 166/293 |
| 4,054,461 | 10/1977 | Martin | 166/293 X |
| 4,065,318 | 12/1977 | Detroit et al. | 106/90 |
| 4,125,160 | 11/1978 | Crinkelmeyer et al. | 166/293 |
| 4,131,578 | 12/1978 | Crinkelmeyer et al. | 260/17.5 |
| 4,223,733 | 9/1980 | Bodor et al. | 166/293 |
| 4,258,790 | 3/1981 | Hale | 166/293 |
| 4,296,813 | 10/1981 | Detroit et al. | 166/293 |
| 4,470,463 | 9/1984 | Holland | 166/293 |
| 4,657,948 | 4/1987 | Roark et al. | 166/293 X |

*Primary Examiner*—George A. Suchfield
*Attorney, Agent, or Firm*—Terry B. McDaniel; Richard L. Schmalz

[57] ABSTRACT

Sulfonated or sulfomethylated lignins reacted with phenol-blocking reagents such as ethylene oxide, propylene oxide, butylene oxide or a combination thereof are disclosed as fluid loss agents for cement slurries. The invention permits fluid loss and thickening time characteristics of the cement slurry to be altered either by increasing the molecular weight of the lignin by crosslinking with formaldehyde or epichlorohydrin or by adding additional agents such as sodium sulfite, sodium meta silicate, sodium phosphate and sodium naphthalene sulfonate.

8 Claims, No Drawings

LIGNIN-BASED CEMENT FLUID LOSS CONTROL ADDITIVE

BACKGROUND OF THE INVENTION

1. Field of the Invention

This invention relates generally to oil well cementing compositions and particularly to lignin-based additives to cementing compositions for reducing fluid loss from the cementing composition to the surrounding subterranean formation which the well has penetrated.

2. Description of the Related Art

Cement compositions are used in the oil and gas industry to cement the annular space in the well bore between the casing and the surrounding formation. Cementing is done not only to secure the casing firmly in place but also to cement off permeable zones of permeable formations into which valuable materials may be lost and to prevent the intrusion of extraneous matter into the petroleum fluid producing zone.

Typically, a cement slurry is pumped downwardly through the tubing within the well casing and flows out of the open lower end of the casing at the well bottom. It is then forced upwardly around the casing in the annular space between the outer wall of the casing and the wall of the wellbore. Commonly, additives of various sorts are added to the cement slurry to control thickening times, weight, strength, and other characteristics of the cements to accommodate the wide variety of temperatures and pressures of various types of oil and gas wells.

When hydraulic cement is placed within or next to a porous medium such as the earthen strata of a well bore, there is often a tendency, especially in deep wells where high temperatures and pressures are common, for water to filter out of the cement slurry and into the surrounding strata. This fluid loss is undesirable because it may lead to contamination of the formation by the cement filtrate, premature setting of the cement, and reduced compressive strength of the set cement. To combat and control fluid loss in the well cementing process, various additives known as fluid loss agents have been discovered and employed in the industry. Examples of commonly used fluid loss additives include cellulose derivatives such as carboxymethyl hydroxyethyl cellulose (CMHEC), hydroxyethyl cellulose (HEC), polyethylene amines, and naphthalene sulfonates, polymer latex, polyacrylamides, and combinations of these. The particular fluid loss additive used depends upon many factors such as the particular cement used, the temperature and pressure to be encountered in the well, and the depth of the well. The expense of the additive is a factor, especially in deep wells where a large quantity of cement must be used.

It would be desirable to have a fluid loss additive derived from a readily available and relatively inexpensive material such as lignin, which is produced in large quantities as a byproduct of the pulp and paper industry. Lignin-derived compositions are already used in cement slurries as set retardation agents, as disclosed in U.S. Pat. Nos. 3,375,873; 3662,830; 3,821,985; 4,047,567; 4,065,318; 4,296,813; RE. 31,190; and RE. 31,127. U.S. Pat. Nos. 4,125,160 and 4,131,578 teach a method and composition for a fluid loss additive composed of a blend of a polyamine, a lignoamine and/or lignosulfonate, a borate ion releasing compound and a carbonate and/or bicarbonate.

SUMMARY OF THE INVENTION

It has been found that sulfonated or sulfomethylated lignins, after being reacted with phenol-blocking reagents such as ethylene oxide, propylene oxide, butylene oxide or a combination thereof show good fluid loss control for cement slurries. The invention permits fluid loss and thickening time characteristics of the cement slurry to be altered to fit particular temperature and thickening time requirements by various means such as by increasing the molecular weight of the lignin either through crosslinking with formaldehyde or epichlorohydrin prior to the addition of the phenol-blocking reagent or by adding other functional additives. In particular, additional agents such as sodium sulfite, sodium meta silicate, sodium phosphate and naphthalene sulfonate are useful to decrease thickening times and prevent gelation of the cement slurry at high temperatures.

DETAILED DESCRIPTION OF THE PREFERRED EMBODIMENT

The term "hydraulic cement" is meant to encompass any inorganic cement such as those falling within the American Petroleum Institute (API) classes designated A, B, C, D, E, F, G, H, J, and N. The amount of water used for the cement slurry depends upon the type of cement used for a specific application, and may be anywhere from 25 to 105 parts water per 100 parts of cement.

The hydraulic cement slurry of the present invention includes an effective amount of a sulfonated or sulfomethylated lignin that has been alkoxylated with a phenol-blocking reagent such as ethylene oxide, propylene oxide, butylene oxide or their combinations. The cement slurry also may contain an effective amount of sodium phosphate, sodium sulfite, sodium metasilicate or naphthalene sulfonate. These constituents are employed in a weight ratio to each other and in a total amount which is effective to reduce the loss of fluid from the slurry under typical well conditions. The exact amount of each constituent and the ratio of each constituent to each other will depend on the hydraulic cement employed and on the temperature and pressure of the well and the thickening time desired. Standardized testing procedures such as those developed and reported by the American Petroleum Institute and as described below can be employed to determine the most preferred parameter for each batch of hydraulic cement and for the expected temperature and pressure.

Sulfonated or sulfomethylated lignins as used in this invention may be obtained as byproducts from kraft process of the pulping of woody materials. The waste liquors from such pulping contain large quantities of lignin and lignin decomposition products, which can be sulfonated or sulfomethylated by known processes. Sulfonated lignins may also be obtained from the sulfite pulping process. Further, sulfonated lignins suitable for the practice of this invention are readily obtainable from commercial sources.

The sulfonated or sulfomethylated lignin is reacted with a phenol blocking agent such as propylene oxide, ethylene oxide, butylene oxide or their combinations by adding the required amount of oxide to an alkaline aqueous solution of up to 31% solids of sulfonated or sulfomethylated lignin and stirring at room temperature for two days, or by any other method known in the art such as heating to 90° C. under pressure.

The particular composition used and the concentration of ingredients depends heavily on the expected conditions of the well. Lignin based products tend to lengthen the thickening time of the cement slurry. In low temperature wells, retardation of thickening is undesirable and may be overcome by two methods. First, accelerators may be added to decrease the thickening time to acceptable levels. Suitable accelerating additives include sodium metasilicate, sodium phosphate, sodium sulfite and naphthalene sulfonate. Second, thickening time may be reduced by increasing the molecular weight of the lignin additive. This is accomplished by crosslinking the lignin with formaldehyde or epichlorohydrin prior to reacting it with an alkylene oxide. At high temperatures, setting of cement is accelerated and the retarding effect of low molecular weight lignin additives is acceptable. One problem which may be encountered at high temperatures is gelation or rapid loss of viscosity of the cement slurry. Gelation may be overcome by adding effective amounts of sodium metasilicate or sodium sulfite to the mixing water.

In the preferred embodiment, the sulfonated or sulfomethylated lignin is a commercially available product such as "REAX 85A ®" obtainable from Westvaco Corporation. REAX 85A is a sodium salt derivative of a high molecular weight kraft sulfonated lignin polymer and, as usually available, has the following typical analysis parameters and physical characteristics:

| Physical Form | Free-flowing Brown Powder |
|---|---|
| Degree of Sulfonation (number of sulfonic acid groups per 1000 unit weight of ash-free lignin) | 1.0 |
| Total Sulfur, % | 4.3 |
| Sulfonate Sulfur, % | 2.4 |
| $Na_2SO_3$, % | 1.3 |
| $Na_2SO_4$ | 3.4 |
| Total Sodium, % | 7.5 |
| Methoxyle, % | 9.8 |
| Moisture, % | 7.0 |
| Sugar, % | 0.0 |
| pH of 2% aqueous solution at 25° C. | 10.9 |
| pH of initial precipitation in 5% solution | 3.5 |
| Insolubles in 5% aqueous solution, % (75° C.) | −0.05 |
| Surface Tension of 1% aqueous solution, dynes/cm | 59.3 |
| Sintering Point, °F. | 385 |
| Conductivity in 5% aqueous solution, mmhos | 9000 |
| Bulk Density, lbs/ft, loose | 28 |
| packed | 33 |

REAX 85A is reacted with 4–6, preferably 5, moles of an alkylene oxide, preferably propylene oxide, per 1000 g of the sulfonated lignin. The dosage of fluid loss additive should be 0.6–2.0% based on cement, preferably 0.8–1.0% for low temperature applications (38°) and 1.5–2.0% for high temperatures (88° C.).

Tests were run in a laboratory to determine the fluid loss properties of specific hydraulic cement slurry systems, encompassed by the present invention.

High pressure fluid loss tests were carried out according to API recommendations RP10B "Testing Oil Well Cements and Cement Additives," Section 8, p. 43 in a Halliburton (IMCO) high pressure filter press. Cement slurry was prepared as described above. After equilibration to 100° F., 140° F., and 150° F, in a water bath (20 minutes) the slurry was transferred in the filter press which was preheated to the same temperature. One thousand psi pressure was applied, and the amount of filtrate collected in 30 minutes determined.

Thickening times were determined in the Halliburton Consistometer (API—Schedule #8, 206° F., 14,000 ft., and #9, 248° F., 16,000 ft.). The additive level was between 0.3 and 2.0% by weight on cement. A total of 304 mL (38% slurry) or 368 mL (46% slurry) with five drops of Halliburton LF defoamer was used with 800 g cement and blended for 35 seconds. After transfer of the slurries into the slurry cup, the slurry was heated according to the API Schedule. The run was terminated when slurry viscosity reached 70 units of consistency.

The API filter loss of all cement slurries without additivies is high—in excess of 1000 mL.

Tables I–III show the results in fluid loss and thickening time tests for REAX-85A reacted with 5 moles of propylene oxide per 1000 g of REAX-85A, for 38% and 46% Louisiana Class H cement and various blends of sodium naphthalene sulfonate or inorganic salts.

TABLE I

FLUID LOSS OF 38% LOUISIANA CLASS H CEMENT SLURRIES CONTAINING REAX 85A-5PO[a] AND BLENDS WITH SODIUM NAPHTHALENE SULFONATE OR INORGANIC SALTS (1,000 psi)

| Fluid Loss Control Additive (%) | | | | Fluid Loss (min/mL) | | |
|---|---|---|---|---|---|---|
| | | | | 38° C. | 60° C. | 88° C. |
| REAX 85A-5PO[a] | (2.0) | | | — | 30/4 | — |
| | (1.5) | | | 30/8 | 30/26 | 30/24 |
| | (1.2) | | | 30/28 | 30/34 | 30/76 |
| | (1.0) | | | 30/22 | 25/116 | 13.5/126 |
| | (1.07) | LOMAR D ®[b] | (0.93) | | | 1.37/140 |
| | (1.0) | | (0.5) | | | 11/80 |
| | (0.93) | | (1.07) | | | 30/28 |
| | (0.8) | | (0.7) | | | 30/56 |
| | (0.75) | | (0.75) | 30/20 | | 30/36 |
| | (0.7) | | (0.8) | | | 8/102 |
| | (0.6) | | (0.6) | | | gelled |
| | (0.5) | | (0.1) | | | 9.5/102 |
| | (1.5) | Sodium | (0.5) | 30/20 | 30/24 | 30/32 |
| | (1.2) | Meta- | (0.4) | 30/26 | 30/36 | 30/58 |
| | (1.0) | silicate | (0.33) | 30/76 | 30/102 | 30/24 |
| | (0.8) | | (0.27) | | | 8/94 |
| | (1.5) | Sodium | (0.5) | 30/22 | 30/26 | 30/48 |
| | (1.2) | Phos- | (0.4) | 30/30 | 30/28 | 30/44 |
| | (1.0) | phate | (0.33) | 30/62 | 30/26 | 30/78 |

TABLE I-continued

FLUID LOSS OF 38% LOUISIANA CLASS H CEMENT SLURRIES CONTAINING REAX 85A-5PO[a] AND BLENDS WITH SODIUM NAPHTHALENE SULFONATE OR INORGANIC SALTS (1,000 psi)

| Fluid Loss Control Additive (%) | | | | | 38° C. | 60° C. | 88° C. |
|---|---|---|---|---|---|---|---|
| (1.0) | | (0.5) | | | | | 30/34 |
| (1.2) | Sodium Sulfite | (0.4) | | | 30/26 | 30/24 | 25/110 |
| (0.75) | LOMAR D[b] | (0.75) | Sodium Meta-silicate | (0.5) | 30/30 | | 18/134 |
| (0.75) | | (0.75) | | (0.4) | | 30/36 | 18/178 |
| (0.5) | | (0.5) | | (0.33) | 30/96 | | 28/114 |
| (0.6) | | (0.6) | | (0.5) | 30/78 | | |
| (0.6) | | (0.6) | | (0.4) | 30/16 | 30/57 | 30/102 |
| (0.6) | | (0.6) | | (0.3) | 30/14 | | |
| (0.6) | LOMAR D[b] | (0.6) | Sodium Phosphate | (0.4) | 30/18 | 30/20 | 9/110 |
| (0.6) | | (0.6) | | (0.33) | | | 19/124 |
| (0.6) | | (0.6) | | (0.3) | | 30/30 | |
| (0.6) | | (0.6) | | (0.2) | | | 7/118 |
| (0.6) | LOMAR D[b] | (0.6) | Sodium Sulfite | (0.4) | 30/18 | 30/106 | 9/122 |

[a]REAX 85A reacted with 5 moles propylene oxide (PO) per 1,000 g
[b]LOMAR D: sodium naphthalene sulfonate As shown in Table I above, the best results for fluid loss prevention at 88° C. for 38% Louisiana Class H cement slurries were obtained by the following: 1.5% REAX 85A-5PO, 0.93% REAX 85A-5PO and 1.07% sodium naphtalene sulfate, 0.75% REAX 85A-5PO and 0.75% sodium naphthalene sulfate, 1.5% REAX 85A-85A-5PO and 0.5% sodium metasilicate, 1.0% REAX 85A-5PO and 0.33% sodium metasilcate, 1.5% REAX 85A-5PO and 0.5% sodium phosphate, and 1.0% REAX 85A-5PO and 0.5% sodium phosphate.

TABLE II

FLUID LOSS OF 46% LOUISIANA CLASS H CEMENT SLURRIES CONTAINING REAX 85A-5PO[a] and BLENDS WITH SODIUM NAPHTHALENE SULFONATE, INORGANIC SALTS OR POLYETHYLENE IMINE (1,000 psi)

| Fluid Loss Additive (%) | | | | 60° C. | 88° C. |
|---|---|---|---|---|---|
| REAX 85A-5PO[a] | (1.0) | | | | 4/208 |
| | (1.2) | | | | 7/172 |
| | (1.5) | | | 30/34 | 30/60 |
| | (2.0) | | | | 30/18 |
| | (1.0) | LOMAR D[b] | (1.0) | | 7/116 |
| | (1.0) | LOMAR D[b] | (1.5) | | 8.5/92 |
| | (1.0) | Sodium Metasilicate | (0.3) | | 15/192 |
| | (1.4) | | (0.6) | | 30/82 |
| | (1.5) | | (0.5) | | 30/38 |
| | (1.6) | | (0.4) | | 30/26 |
| | (1.4) | Sodium Phosphate | (0.6) | | 27.5/116 |
| | (1.5) | | (0.5) | | 30/38 |
| | (1.6) | | (0.4) | 30/30 | 30/30 |
| | (1.8) | | (0.2) | | 30/174 |
| | (1.5) | Phosphoric Acid | (0.1) | 30/142 | |
| | (1.5) | Sodium Pyrophosphate | (0.5) | | 7/164 |
| | (1.6) | Sodium Metaphosphate | (0.4) | | 5/172 |
| | (1.8) | | (0.2) | | 9.5/156 |
| | (1.5) | Sodium Phosphate | (0.5) | | 12.5/168 |
| | (1.5) | Sodium Sulfite | (0.5) | | 30/148 |
| | (1.6) | | (0.4) | | 30/46 |
| | (1.8) | | (0.2) | | 30/28 |
| | (1.6) | Sodium Sulfate | (0.4) | | 30/56 |
| | (1.8) | | (0.2) | | 30/16 |
| | (1.9) | | (0.1) | | 30/28 |
| | (1.6) | Sulfuric Acid | (0.4) | | 29/140 |
| | (1.6) | Magnesium Sulfate | (0.2) | | 1.5/160 |
| | (1.6) | | (0.4) | | 2/146 |
| | (1.8) | Sodium Carbonate | (0.2) | | 11.5/140 |
| | (1.5) | Sodium Fluoride | (0.1) | | 3/198 |
| | (1.5) | | (0.5) | | 2.5/156 |
| | (1.5) | Sodium Gluconate | (0.1) | | 7/214 |
| | (1.5) | Triethanolamine | (0.17) | | 1/110 |
| | (1.5) | | (0.37) | | 1/92 |
| | (0.5) | Corcate P-12 ®[c] | (1.0) | | 0.63/156 |
| | (1.0) | | (0.5) | | 4/220 |
| | (1.0) | | (1.0) | | 22/196 |
| | (1.5) | | (0.5) | | 30/58 |
| | (1.8) | | (0.2) | | 30/40 |
| | (1.9) | | (0.1) | | 30/30 |

[a]REAX 85A reacted with 5 moles propylene oxide (PO) per 1,000 g
[b]LOMAR D: Sodium naphthalene sulfonate
[c]Polyethyleneimine (Cordova Chemical Company)

As shown in Table II above, the best results for fluid loss prevention at 88° C. for 46% Louisiana Class H cement slurries were obtained by the following: 2% REAX 85A-5PO, 1.6% REAX 85A-5PO and 0.4% sodium metasilicate, 1.5% REAX 85A-5PO and 0.5% sodium phosphate, 1.6 REAX 85A-5PO and 0.4% sodium phosphate, 1.8% REAX 85A-5PO and 0.2% sodium sulfite, 1.8% REAX 85A-5PO and 0.2% sodium sulfate, and 1.9% REAX 85A-5PO and 0.1% polyethyleneimine.

TABLE III

THICKENING TIMES OF 38% AND 46% LOUISIANA CLASS H CEMENT FRESH WATER SLURRIES CONTAINING REAX 85A-5PO[a] AND BLENDS WITH SODIUM NAPHTHALENE SULFONATE AND INORGANIC SALTS
(API Schedule #8, 14,000 ft., 206° F.)

| Fluid Loss Control Additive (%) | | | | | | Thickening Time (hrs.; min.) |
|---|---|---|---|---|---|---|
| *46% Water* | | | | | | |
| REAX 85-5PO[a] | (1.6) | | | | | 7+ |
| | (1.6) | Sodium Sulfite | (0.4) | | | 7+ |
| | (1.4) | Sodium Sulfite | (0.6) | | | 7+ |
| | (1.4) | Sodium Metasilicate | (0.6) | | | 7:14 |
| | (1.4) | Sodium Phosphate | (0.5) | | | 4:57 |
| | (1.4) | Sodium Phosphate | (0.6) | | | 3:10 |
| | (1.8) | Sodium Phosphate | (0.2) | | | 7+ |
| | (1.5) | Corcate P-12[b] | (0.5) | | | 6:30+ |
| Control | | | | | | 1:06 |
| *38% Water* | | | | | | |
| REAX 85-5PO | (0.3) | | | | | 1:25 |
| | (0.5) | | | | | 4:16 |
| | (0.6) | | | | | 7+ |
| | (0.7) | | | | | 7+ |
| | (1.2) | Sodium Metasilicate | (0.4) | | | 6+ |
| | (1.2) | Sodium Phosphate | (0.4) | | | 6:50 |
| | (0.75) | LOMAR D[c] | (0.75) | | | 6:30+ |
| | (0.75) | | (0.75) | Sodium Metasilicate | (0.5) | 3:50 |
| | (0.6) | | (0.6) | | (0.4) | 3:24 |
| | (0.6) | | (0.6) | | (0.35) | 4:53 |
| | (0.6) | | (0.6) | | (0.3) | 7:00 |
| | (0.6) | | (0.6) | Sodium Phosphate | (0.4) | 2:12 |
| | (0.6) | | (0.6) | Sodium Sulfite | (0.4) | 2:23 |

[a]REAX 85A reacted with 5 moles propylene oxide (PO) per 1,000 g
[b]Polyethylene imine (Cordova Chemical Company)
[c]Sodium naphthalene sulfonate As shown above, the retardation effects of REAX 85A-5PO can be reduced by the addition of sodium naphthalene sulfonate and inorganic salts such as sodium sulfite, sodium metasilicate, or sodium phosphate.

Tables IV-V show the effect of a greater (6 moles per 1000 g) or lesser (4 moles per 1000 g) degree of propoxylation on thickening time and fluid loss:

TABLE IV

FLUID LOSS OF 38% LOUISIANA CLASS H CEMENT SLURRIES CONTAINING REAX 85A-4PO, REAX 85A-5PO, REAX 85A-6PO, AND BLENDS WITH SODIUM NAPHTHALENE SULFONATE AND INORGANIC SALTS

| | Fluid Loss Control Additive (% Dosage) | | | | | | Fluid Loss (min./mL) | | |
|---|---|---|---|---|---|---|---|---|---|
| | | | | | | | 38° C. | 60° C. | 88° C. |
| REAX 85A-5PO[a] | (1.5) | | | | | | 30/8 | 30/26 | 30/24 |
| REAX 85A-4PO[a] | (1.2) | | | | | | 30/14 | 11/118 | — |
| | (1.5) | | | | | | 30/10 | 30/42 | 30/30 |
| | (1.2) | Sodium Metasilicate | (0.4) | | | | 30/14 | 30/28 | 30/26 |
| | (1.5) | | (0.5) | | | | | 30/22 | 30/58 |
| | (1.2) | Sodium Phosphate | (0.4) | | | | 30/12 | 30/24 | 30/34 |
| | (1.5) | | (0.5) | | | | | 30/18 | 30/34 |
| | (0.6) | LOMAR D[b] | (0.6) | Sodium Metasilicate | (0.3) | | | 30/62 | |
| | (0.6) | LOMAR D[b] | (0.6) | Sodium Metasilicate | (0.4) | | 30/18 | 30/56 | 18/140 |
| | (0.6) | LOMAR D[b] | (0.6) | Sodium Phosphate | (0.4) | | 30/12 | 30/32 | 55/108 |
| REAX 85A-5PO[a] | (1.5) | | | | | | 30/8 | 30/26 | 30/24 |
| REAX 85A-6PO[a] | (1.2) | | | | | | 30/22 | 30/54 | 3/128 |
| | (1.5) | | | | | | 30/16 | 18/116 | 4/104 |
| | (1.2) | Sodium | (0.4) | | | | 30/24 | 30/46 | 30/28 |

TABLE IV-continued

FLUID LOSS OF 38% LOUISIANA CLASS H CEMENT SLURRIES CONTAINING REAX 85A-4PO, REAX 85A-5PO, REAX 85A-6PO, AND BLENDS WITH SODIUM NAPHTHALENE SULFONATE AND INORGANIC SALTS

| Fluid Loss Control Additive (% Dosage) | | | | | | Fluid Loss (min./mL) | | |
|---|---|---|---|---|---|---|---|---|
| | | | | | | 38° C. | 60° C. | 88° C. |
| (1.5) | Metasilicate | (0.5) | | | | | | 30/14 |
| (1.2) | Sodium Phosphate | (0.4) | | | | 30/19 | 30/16 | 30/72 |
| (1.5) | | (0.5) | | | | | 30/24 | 30/28 |
| (0.6) | LOMAR D[b] | (0.6) | Sodium Metasilicate | (0.4) | | 30/10 | 30/30 | 30/72 |
| (0.6) | LOMAR D[b] | (0.6) | Sodium Phosphate | (0.4) | | 30/16 | 30/18 | 23/148 |

[a]REAX 85A reached with X moles propylene oxide (PO) per 1000 g.
[b]LOMAR D: Sodium naphthalene sulfonate.

As shown above, REAX 85A-5PO shows better fluid loss performance than the under and over propoxylated products by themselves. Addition of small amounts of sodium metasilicate or sodium phosphate restores fluid loss control. As shown below, with REAX 85A-4PO in combination with sodium methasilicate shows longer thickening times than REAX 85A-5PO and REAX 85A-6PO in combination with sodium metasilicate, but only small differences are observed when combined with sodium phosphate.

TABLE V

THICKENING TIMES OF 38% LOUISIANA CLASS H FRESH WATER CEMENT SLURRIES CONTAINING BLENDS OF PROPOXYLATED REAX 85A, LOMAR D, AND SODIUM METASILICATE OR SODIUM PHOSPHATE API SCHEDULE #8 (206° F., 14,000 FT.)

| Fluid Loss Control Additive | | | | | | Thickening Time (Hrs:Min.) |
|---|---|---|---|---|---|---|
| REAX 85A-4PO[a] | (0.6) | LOMAR D[b] | (0.6) | Sodium Metasilicate | (0.4) | 4:32 |
| REAX 85A-5PO[a] | (0.6) | LOMAR D[b] | (0.6) | Sodium Metasilicate | (0.4) | 3:24 |
| REAX 85A-6PO[a] | (0.6) | LOMAR D[b] | (0.6) | Sodium Metasilicate | (0.4) | 3:36 |
| REAX 85A-4PO[a] | (0.6) | LOMAR D[b] | (0.6) | Sodium Phosphate | (0.4) | 2:28 |
| REAX 85A-5PO[a] | (0.6) | LOMAR D[b] | (0.6) | Sodium Phosphate | (0.4) | 2:12 |
| REAX 85A-6PO[a] | (0.6) | LOMAR D[b] | (0.6) | Sodium Phosphate | (0.4) | 2:12 |

[a]REAX 85A reached with X moles propylene oxide (PO) per 1000 g
[b]LOMAR D: sodium naphthalene sulfonate Where a higher molecular weight additive is desired, to increase thickening time, the REAX 85A may be crosslinked with formaldehyde or epichlorohydrin prior to propyoxylation. To accomplish the crosslinking the appropriate amount of formaldehyde solution (0.25-0.75 moles of formaldehyde per 1000 g REAX 85A) or epichlorohydrin (0.50-1.5 moles of epichlorohydrin per 1000 g REAX 85A) is added to REAX 85A (25%-28% solids) and heated to 95° C. Reaction time is 6-36 hours for formaldehyde and about 4 hours for epichlorohydrin. Increased reaction time increases the viscosity of the lignin-formaldehyde condensate. The solution is cooled to room temperature before the addition of propylene oxide.

In the formaldehyde reaction, it is important that the sulfonated lignin used be one that is relatively free of unreacted sodium sulfite; otherwise the formaldehyde reacts with sodium sulfite and then with the sulfonated lignin to produce a lignin with a higher degree of sulfonation rather than a higher molecular weight.

Table VI shows the effect of crosslinking with formaldehyde or epichlorohydrin on thickening times:

TABLE VI

THICKENING TIMES OF 38% LOUISIANA CLASS H FRESH WATER CEMENT SLURRIES CONTAINING 0.5% PROPOXYLATED FORMALDEHYDE (FA) OR EPICHLOROHYDRIN (EPI) TREATED REAX 85A API SCHEDULE #8 (206° F., 14,000 FT.)

| | |
|---|---|
| REAX 85A - 5PO[a] | 4:44 |
| REAX 85A - 0.25FA - 5PO[a] | 2:32 |
| REAX 85A - 0.5FA - 5PO[a] | 2:36 |
| REAX 85A - 0.75FA - 5PO[a] | 2:23 |
| REAX 85A - 0.5EPI - 5PO[b] | 1:55 |

[a]REAX 85A was reacted with x moles of formaldehyde (FA) per 1000 g of REAX 85A for 16 hours @ 95° C.
[b]REAX 85A was reacted with 0.5 moles of epichlorohydrin (EPI) per 1000 g of REAX 85A for 4 hours @ 95° C.

Table VII shows the influence of the degree of formaldehyde crosslinking on fluid loss:

TABLE VII

FLUID LOSS OF 46% LOUISIANA CLASS H CEMENT SLURRIES CONTAINING PROPOXYLATED FORMALDEHYDE TREATED REAX 85A AND BLENDS WITH INORGANIC SALTS. INFLUENCE OF DEGREE OF FORMALDEHYDE CROSSLINKING ON FLUID LOSS AT 1,000 psi

| Fluid Loss Control Additive (%) | | | | Fluid Loss (min./mL) 38° C. | 60° C. | 88° C. |
|---|---|---|---|---|---|---|
| REAX 85A-0.25FA-5PO[a] | (0.5) | | | 30/136 | | |
| | (0.6) | | | 30/64 | | |
| | (0.8) | | | 30/48 | | |
| | (1.0) | | | 30/16 | 9/156 | |
| | (1.5) | | | 30/8 | | 30/100 |
| REAX 85A-0.35FA-5PO[a] | (0.6) | | | 18/178 | | |
| | (0.8) | | | 30/68 | | |
| | (1.5) | | | | | 3/140 |
| | (1.5) | Sodium Metasilicate | (0.5) | | | 30/44 |
| | (1.5) | Sodium Phosphate | (0.5) | | | 30/60 |
| REAX 85A-0.5FA-5PO[a] | (0.6) | | | 19/170 | | |
| | (0.8) | | | 30/14 | | |
| | (1.0) | | | | 18/150 | |
| | (1.5) | | | | | 4/130 |
| | (0.6) | Sodium Metasilicate | (0.2) | 30/94 | | |
| | (1.5) | Sodium Metasilicate | (0.5) | | | 30/22 |
| | (0.6) | Sodium Phosphate | (0.2) | 30/14 | | |
| | (1.5) | Sodium Phosphate | (0.5) | | | 30/36 |
| | (0.6) | Sodium Sulfite | (0.2) | 30/48 | | |
| | (0.6) | Sodium LOMAR D | (0.2) | 30/38 | | |
| REAX 85A-0.75FA-2PO[a] | (0.6) | | | 25/170 | | |
| | (0.8) | | | 30/30 | | |
| | (1.0) | | | | 30/84 | |
| | (1.5) | | | | | 3.5/144 |
| | (2.0) | | | | | 4/142 |
| | (1.5) | Sodium Metasilicate | (0.5) | | | 30/32 |
| | (1.5) | Sodium Phosphate | (0.5) | | | 30/42 |
| | (1.5) | | | | | |

[a]REAX 85A was reacted with x moles of formaldehyde (FA) per 1000 g of REAX 85A for 16 hours @ 95° C.

TABLE VIII

FLUID LOSS OF 46% LOUISIANA CLASS H CEMENT SLURRY CONTAINING PROPOXYLATED EPICHLOROHYDRIN TREATED REAX 85A (1,000 psi)

| Fluid Loss Control Additive (%) | | | | Fluid Loss (min/mL) 38° C. | 88° C. |
|---|---|---|---|---|---|
| REAX 85A-0.2EPI-5PO[a] | (0.8) | | | 16/142 | 0.75/146 |
| | (1.5) | | | | 27/128 |
| | (2.0) | | | 30/90 | |
| | (1.5) | Sodium Metasilicate | (0.5) | | 30/30 |
| | (1.5) | Sodium Phosphate | (0.5) | | 30/54 |
| REAX 85A-0.4EPI-5PO[a] | (0.8) | | | 30/126 | 0.75/136 |
| | (1.5) | | | | 6/142 |
| | (2.0) | | | | 3/150 |
| | (1.5) | Sodium Metasilicate | (0.5) | | 30/36 |
| | (1.5) | Sodium Phosphate | (0.5) | | 30/21 |
| REAX 85A-0.5EPI-5PO[a] | (0.8) | | | 30/18 | |
| | (2.0) | | | | 2.15/150 |
| | (1.5) | Sodium Metasilicate | (0.5) | | 30/26 |
| | (1.5) | Sodium Phosphate | (0.5) | | 30/48 |
| | (1.5) | Sodium Sulfite | (0.1) | | 30/12 |
| REAX 85A-4PO-1EPI[b] | (0.8) | | | | |
| | (1.5) | | | | 2.5/106 |
| | (1.5) | Sodium Metasilicate | (0.5) | | 30/32 |
| | (1.5) | Sodium Phosphate | (0.5) | | 30/22 |
| | (1.5) | Sodium Sulfite | (0.1) | | 30/102 |

[a]REAX 85A was reacted with x moles of epichlorohydrin (EPI) per 100 g of lignin for 4 hours @ 95° C.
[b]REAX 85A was propoxylated with 4 moles propylene oxide (PO) per 1,000 g and post-reacted with 1 mole epichlorohydrin (EPI) for 4 hours @ 95° C.

As shown in Tables VI–VIII, crosslinking with formaldehyde or epichlorohydrin substantially reduces thickening time, but fluid loss performance of the crosslinked products by themselves is not as good as with REAX 85A-5PO. Fluid loss performance of the crosslinked products is improved with the addition of sodium metasilicate, sodium phosphate, and sodium sulfite.

While the invention has been described and illustrated herein by references to various specific materials, procedures and examples, it is understood that the invention is not restricted to the particular materials, combinations of materials, and procedures selected for that purpose. Numerous variations of such details can be employed, as will be appreciated by those skilled in the art.

I claim:

1. A hydraulic cement slurry composition which comprises:
   (a) a hydraulic cement, and the following expressed as parts by weight per 100 parts of said hydraulic cement,
   (b) water from about 25 to 105 parts, and
   (c) from about 0.5 to 2.5 parts of a compound selected from the group consisting of a sulfonated lignin and a sulfomethylated lignin, wherein said lignin has been sequentially crosslinked by reacting said lignin with a member of the group consisting of formaldehyde and epichlorohydrin and alkoxylated with between about 2 to about 6 moles of a compound selected from the group consisting of ethylene oxide, propylene oxide, butylene oxide and a combination thereof per 1000 g of said lignin.

2. The composition of claim 1, further comprising 0.1 to 1.0 parts of a compound selected from the group of sodium metasilicate, sodium phosphate, sodium sulfite, sodium naphthalene sulfonate or a combination thereof.

3. The composition of claim 1, wherein said lignin has been crosslinked by reacting said lignin with 0.25 to about 0.75 moles of formaldehyde per 1000 g of said lignin.

4. The composition of claim 1, wherein said lignin has been crosslinked by reacting said lignin with about 0.5 to 1.5 moles of epichlorohydrin per 1000 g of said lignin.

5. A method of cementing a zone in a well penetrating a subterranean formation comprising injecting down the well and positioning in the zone to be cemented a hydraulic aqueous cement slurry composition comprising
   (a) a hydraulic cement, and the following expressed as parts by weight per 100 parts of said hydraulic cement,
   (b) water from about 25 to 105 parts, and
   (c) a fluid loss additive comprising from about 0.5 to 2.5 parts of a compound selected from the group consisting of a sulfonated lignin and a sulfomethylated lignin, wherein said lignin has been sequentially crosslinked by reacting said lignin with a member of the group consisting of formaldehyde and epichlorohydrin and alkoxylated with between about 2 to about 6 moles of a compound selected from the group consisting of ethylene oxide, propylene oxide and butylene oxide or a combination thereof per 1000 g of said lignin, and allowing the cement thus positioned to set to a monolithic mass.

6. The method of claim 5, wherein said fluid loss additive further comprises 0.1 to 1.0 parts of a compound selected from the group consisting of sodium metasilicate, sodium phosphate, sodium sulfite and sodium naphthalene sulfonate or a combination thereof.

7. The method of claim 5, wherein said lignin has been crosslinked by reacting said lignin with about 0.25 to about 0.75 moles of formaldehyde per 1000 g of said lignin.

8. The method of claim 5, wherein said lignin has been crosslinked by reacting said lignin with about 0.5 to 1.0 moles of epichlorohydrin per 1000 g of said lignin.

* * * * *